（12） United States Patent
Mori

(10) Patent No.: US 9,076,069 B2
(45) Date of Patent: Jul. 7, 2015

(54) REGISTERING METADATA APPARATUS

(75) Inventor: Kouichirou Mori, Saitama-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 702 days.

(21) Appl. No.: 13/046,941

(22) Filed: Mar. 14, 2011

(65) Prior Publication Data

US 2012/0062597 A1 Mar. 15, 2012

(30) Foreign Application Priority Data

Sep. 14, 2010 (JP) ............................... P2010-206166

(51) Int. Cl.
G06K 9/46 (2006.01)
G06K 9/66 (2006.01)
G06K 9/50 (2006.01)
G06K 9/32 (2006.01)
G06K 9/60 (2006.01)
G06T 7/00 (2006.01)
H04N 5/445 (2011.01)
G06F 17/30 (2006.01)
G09G 5/00 (2006.01)

(52) U.S. Cl.
CPC ............ G06K 9/4671 (2013.01); G06T 7/0028 (2013.01); H04N 5/44504 (2013.01); G06F 17/30268 (2013.01)

(58) Field of Classification Search
CPC .... G06T 7/0028; G06T 2207/00; G06K 9/00; G06F 17/30265; H04N 5/44504
USPC .................... 382/190, 201, 294, 305; 345/636
See application file for complete search history.

(56) References Cited

U.S. PATENT DOCUMENTS

| 6,711,293 | B1 | 3/2004 | Lowe | |
|---|---|---|---|---|
| 6,804,684 | B2* | 10/2004 | Stubler et al. .......................... | 1/1 |
| 7,403,642 | B2* | 7/2008 | Zhang et al. ................... | 382/118 |
| 7,519,200 | B2* | 4/2009 | Gokturk et al. ............... | 382/118 |
| 7,694,885 | B1* | 4/2010 | Bourdev ........................ | 235/487 |
| 7,831,141 | B2* | 11/2010 | Wassingbo et al. ........... | 396/429 |

(Continued)

FOREIGN PATENT DOCUMENTS

| JP | 2006-004298 | 1/2006 |
|---|---|---|
| JP | 2009-130549 | 6/2009 |
| JP | 2010-009337 | 1/2010 |

OTHER PUBLICATIONS

Japanese Office Action for Japanese Application No. 2010-206166 mailed on Jul. 20, 2012.

*Primary Examiner* — Matthew Bella
*Assistant Examiner* — Jose M Torres
(74) *Attorney, Agent, or Firm* — Amin, Turocy & Watson, LLP

(57) ABSTRACT

An adding metadata apparatus includes a first acquisition unit which acquires a first image, first metadata, and a first position within the first image, the first position being for displaying the first metadata; an extraction unit which extracts local features from the first image; a calculation unit which searches for a group of the local features within a predetermined distance from the first position, and calculates a representative point of the group; a search unit which matches the first image with a plurality of images stored in a database by using the local features, and searches for a second image which coincides with the local features; and a registration unit which calculates a second position, within the second image, corresponding to the representative point, and registers the second position and the first metadata as metadata for the second image.

11 Claims, 14 Drawing Sheets

PHOTOGRAPHED IMAGE OF USER 1

PHOTOGRAPHED IMAGE OF USER 2

(56) References Cited

U.S. PATENT DOCUMENTS

| | | | |
|---|---|---|---|
| 8,150,098 B2* | 4/2012 | Gallagher et al. | 382/100 |
| 8,160,400 B2* | 4/2012 | Snavely et al. | 382/305 |
| 8,369,570 B2* | 2/2013 | Myers et al. | 382/103 |
| 2002/0055955 A1* | 5/2002 | Lloyd-Jones et al. | 707/512 |
| 2005/0185060 A1* | 8/2005 | Neven, Sr. | 348/211.2 |
| 2007/0098303 A1* | 5/2007 | Gallagher et al. | 382/305 |
| 2008/0304753 A1* | 12/2008 | Sohma et al. | 382/218 |
| 2010/0235400 A1* | 9/2010 | Myers et al. | 707/802 |

* cited by examiner

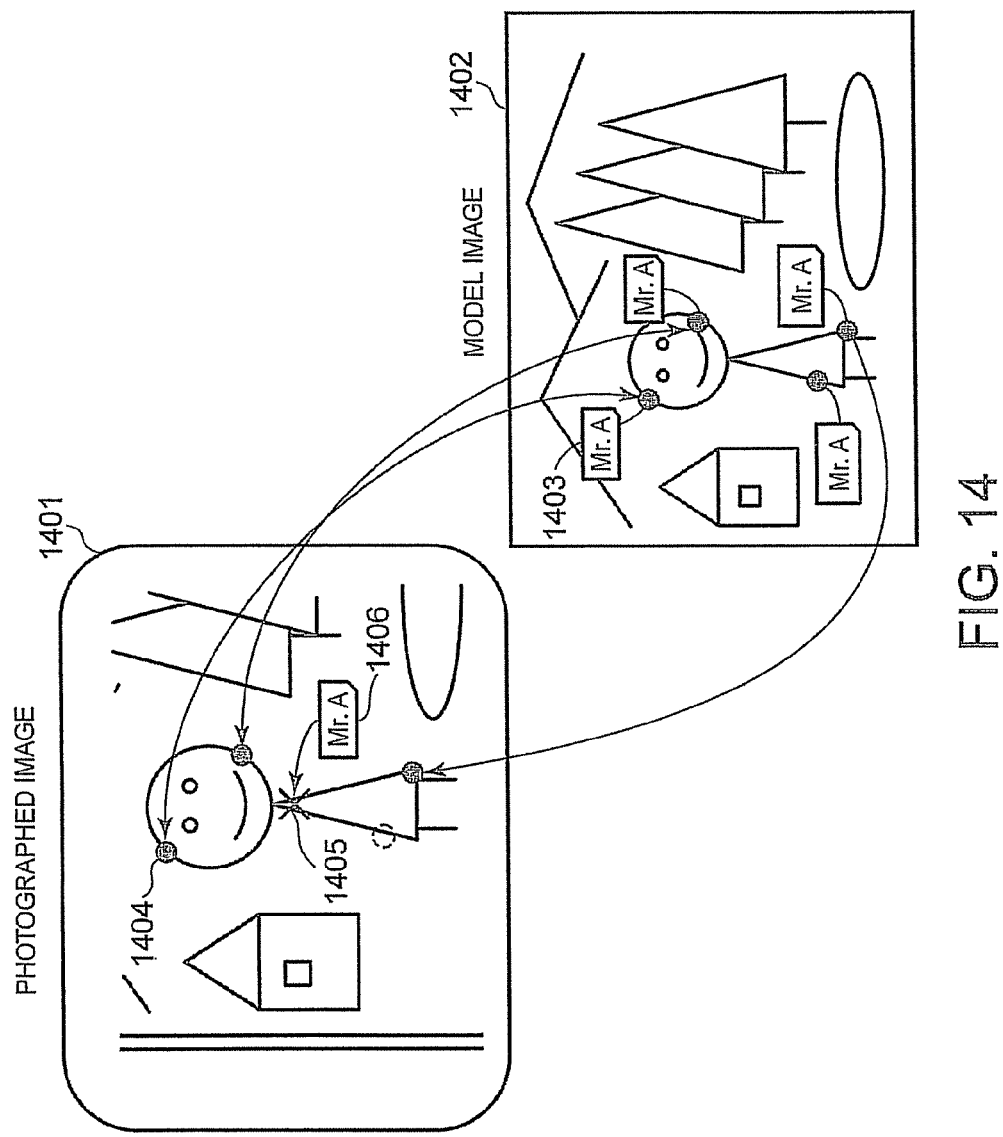

REGISTERING METADATA APPARATUS

CROSS-REFERENCE TO RELATED APPLICATION

This application is based upon and claims the benefit of priority from Japanese Patent Application No. P2010-206166, filed on Sep. 14, 2010; the entire contents of which are incorporated herein by reference.

FIELD

Embodiments described herein generally relate to an adding metadata apparatus.

BACKGROUND

Proposed is a system which acquires, from a server, information regarding an object photographed with a camera of a portable terminal, and which shows the acquired information on the portable terminal.

Japanese Patent Application Laid-Open No. 2010-9337 proposes an apparatus that searches for an image (not an entire image), similar to an extracted part of an image. Further, the apparatus which attaches a corresponding keyword to the image is also proposed.

BRIEF DESCRIPTION OF THE DRAWINGS

FIG. 14 is a diagram showing a concrete example of a process for reading local metadata.

DETAILED DESCRIPTION

A problem is that arbitrary metadata cannot be attached into an arbitrary position of a user-photographed image, and that the metadata attached to the photographed image cannot be shared with another user with each other.

A problem to be solved by the present embodiment is to provide an adding metadata apparatus which attaches metadata to an image and can be shared.

In order to solve the above problem, the adding metadata apparatus according to embodiments of the present invention includes a first acquisition unit which acquires a first image, first metadata, and a first position within the first image, the first position being for displaying the first metadata; an extraction unit which extracts local features from the first image; a calculation unit which searches for a group of the local features within a predetermined distance from the first position, and calculates a representative point of the group; a search unit which matches the first image with a plurality of images stored in a database by using the local features, and searches for a second image which coincides with the local features; and a registration unit which calculates a second position, within the second image, corresponding to the representative point, and registers the second position and the first metadata as metadata for the second image.

In many cases, metadata (such as a keyword or URL) corresponding to an image is data that has been given in advance. In this case, it is difficult to attach arbitrary metadata to the image photographed by a user, in association with each other, to attach metadata into an arbitrary position in the image, and to share the metadata attached to the photographed image with another user.

Figure 1:
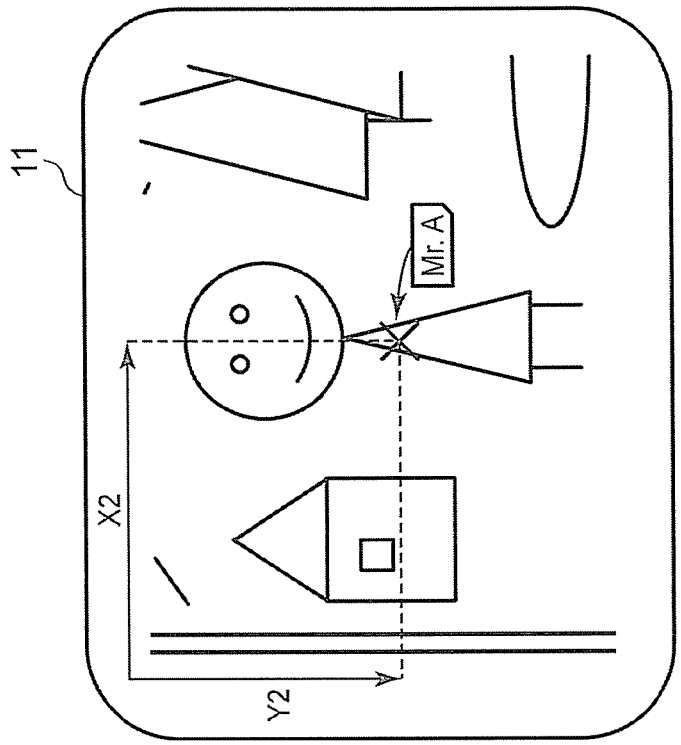
FIG. 1 is a diagram showing images of the same object photographed from different viewpoints by a user 1 and a user 2 respectively.
Figure 1:
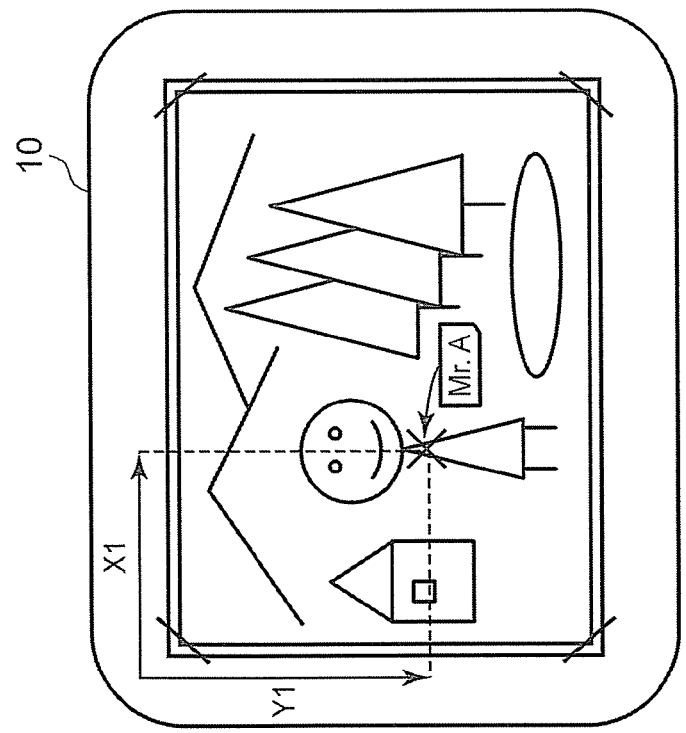

For example, it is not possible to specify the position of the metadata, because different images are obtained by different users even if the users photograph the same object. FIG. 1 shows an example of images of the same object photographed from different viewpoints by a user 1 and a user 2, respectively. A photographed image 10 of the user 1 is taken in a position in which the entire painting is taken by a zoom-out operation of the camera. On the other hand, a photographed image 11 of the user 2 is taken in a position in which an object person is mainly taken by a zoom-in operation of the camera. Descriptions will now be made to a case in which the user 1 attaches local metadata to the object person "Mr. A"; and in which the user-attached metadata representing "Mr. A" is displayed (restored) in the photographed image of the user 2. The local metadata for displaying "Mr. A" in the photographed image 10 of the user 1 has coordinates (X1, X1). The object person in a photographed image 11 of the user 2 has coordinates (X2, Y2). In this case, the coordinates (X1, Y1) and (X2, Y2) are different from each other. Thus, a method for simply storing the coordinates is not applicable. That is, the local metadata attached by a user cannot be restored on the photographed image of another user.

In this embodiment, descriptions will now be made to a process for registering metadata for displaying local metadata in an appropriate position of the image, between different users.

Note that the metadata includes two kinds of metadata, that is, global metadata and local metadata. The global metadata is attached to the entire image, while the local metadata is attached partially to the image.

Figure 2:
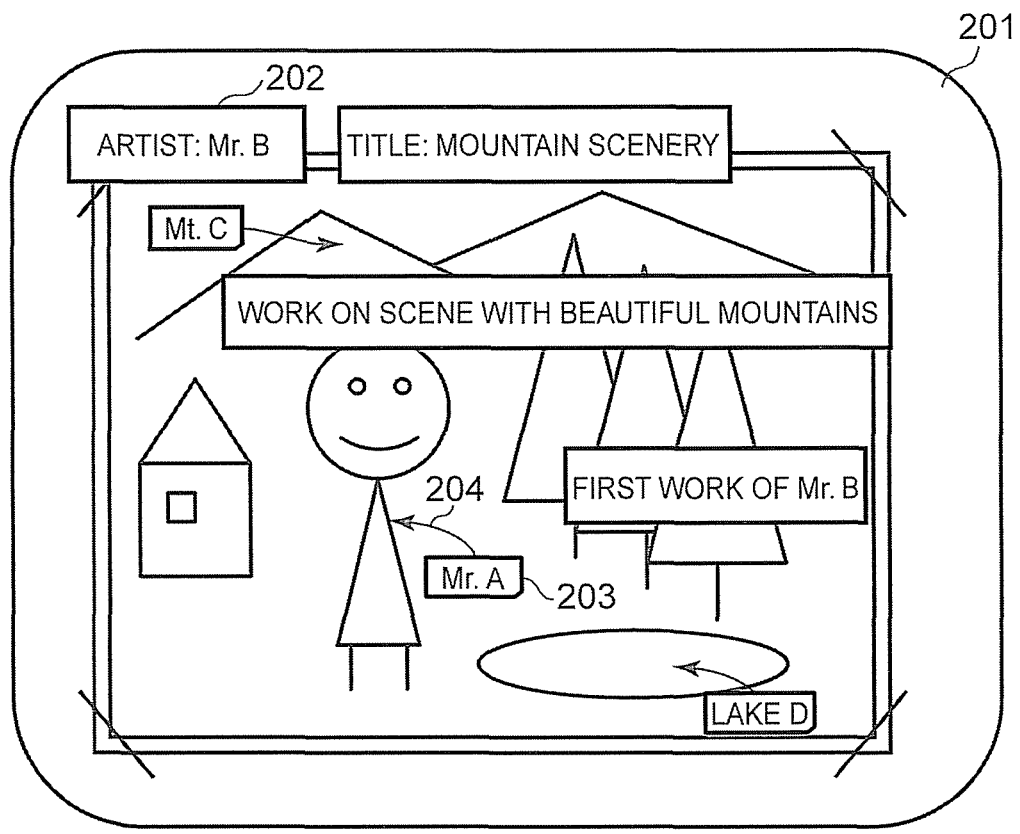
FIG. 2 is a diagram showing an example of a photographed painting (picture) image.

For example, FIG. 2 shows an example of a photographed painting image. The global metadata 202 is attached to an entire photographed image 201. In FIG. 2, the global metadata includes "artist: Mr. B" and "work on a scene with beautiful mountains". The displayed position is arbitrary. The global metadata may be displayed through various displaying methods, such as being displayed in the form of an icon, by scrolling the text, or the like. Local metadata 203 is attached to a part of the image. In FIG. 2, the metadata includes "Mr. A", "Mt. C", and "Lake D". The local metadata is attached to a part of the image. Thus, the local metadata may be displayed with a displaying method, for example, for indicating with an arrow 204. This shows the position into which the local metadata is attached.

Descriptions will now be made to an annotation apparatus according to the embodiment of the present invention with reference to the drawings.

First Embodiment

Figure 3:
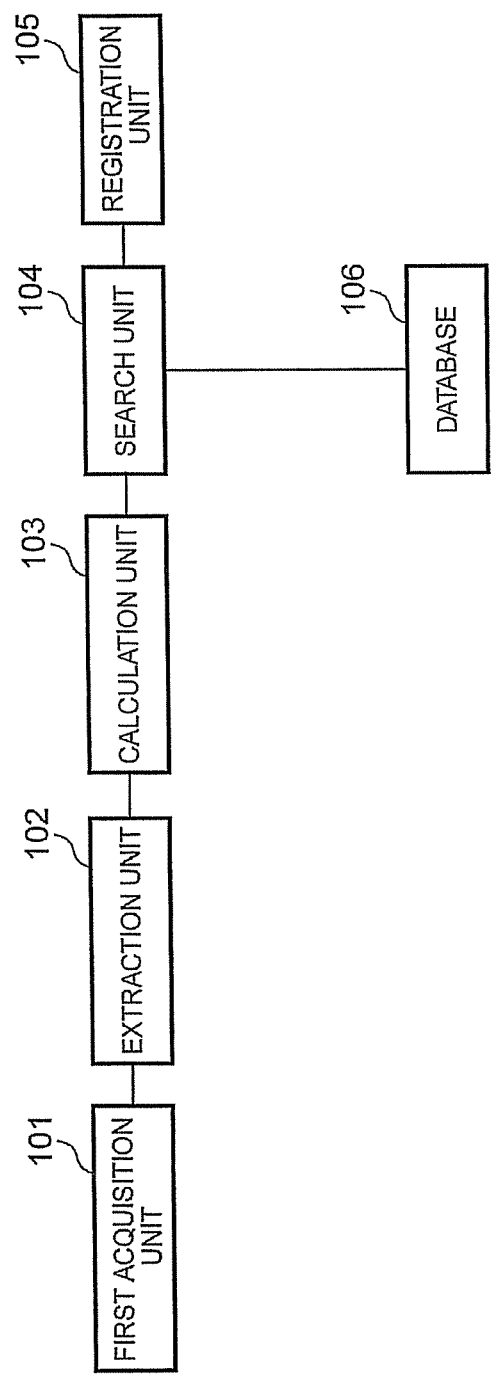
FIG. 3 is a diagram showing a configuration of an annotation apparatus according to an embodiment of the present invention.

FIG. 3 is a diagram showing a configuration of the annotation apparatus according to this embodiment. The annotation apparatus according to this embodiment includes a first acquisition unit 101, an extraction unit 102, a calculation unit 103, a search unit 104, a registration unit 105, and a database 106 for storing reference images.

In this embodiment, under the assumption of the following situations, descriptions will be made to the annotation apparatus according to this embodiment. First, a user photographs an object with a camera. A painting image of FIG. 2 that has been photographed with, for example, a portable terminal is uploaded to a management server (database) that manages images and metadata, through the Internet. The management server searches for an image similar to the photographed image, and transmits registered metadata (information regarding the painting or comments from other users). The transmitted metadata overlaps with the photographed image, and is displayed on the display unit of the portable terminal. The image is not necessarily a still image, and may be moving images. For example, each frame image of the moving images may be transmitted to the server, and metadata corresponding the moving images may be displayed in real time.

Figure 4:
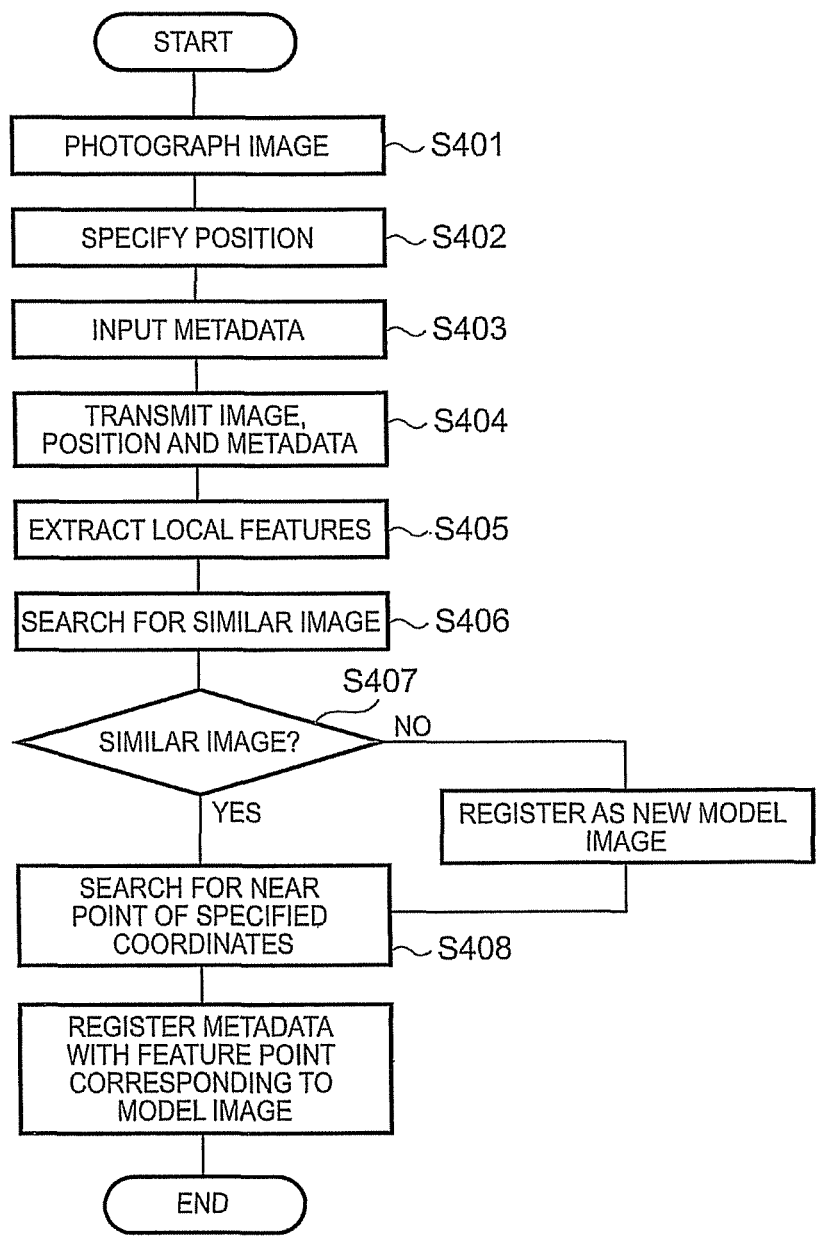
FIG. 4 is a flowchart showing a metadata registration process according to the embodiment of the present invention.

FIG. 4 is a flow chart for registering local metadata. The user specifies a part of the user-photographed image and inputs metadata. The portable terminal transmits the image, position (coordinates) of the specified image and metadata to the server, so as to register the local metadata. Descriptions will now be made to a process for registering local metadata, as performed by the annotation apparatus according to this embodiment, with reference to FIG. 4.

The user photographs a desired image (S401), and specifies a target position into which metadata is attached in the photographed image, using an input unit, such as a touch panel, a pointing device, or the like (S402). The specified position in the photographed image is found and stored in the form of coordinates (X1, Y1). In addition, desired text or voice is input as metadata that the user desires to attach, using an input unit, such as a keyboard or microphone (S403). The photographed image, its coordinates, and metadata are transmitted to the management server (S404).

The first acquisition unit 101 acquires the image, the coordinates and the metadata, and transmits them to the extraction unit 102. The extraction unit 102 extracts local features of the photographed image (S405). The extracted local features are transmitted to the calculation unit 103 and the search unit 104. The calculation unit 103 searches for a group of local features within a predetermined distance from the specified coordinates, and calculates the representative point of the group of local features.

The search unit 104 compares the photographed image and a plurality of images stored in the database, using the local features, and determines whether the photographed image coincides with any of the images (S406). When determined that there is a particular image (hereinafter referred to as a "model image") that is most similar to the photographed image (S407), the unit transmits its image ID to the registration unit 105.

The calculation unit 103 acquires a group of local feature points within a predetermined distance from the user-specified coordinates (X1, Y1) on the photographed image (S408). For example, the unit acquires the data using a method for searching for K-nearest neighbor (a K-number of higher-rank points at a short distance). Specifically, the unit searches for points included in the radius R of the coordinates (X1, Y1). The local feature points that have been obtained in the search are referred to as near points of the specified coordinates (X1, Y1).

Now, obtained are the local feature points on the model image. Each of the local feature point corresponds to each near point of the photographed image. The matching of the local feature points may be performed in accordance with a method using a threshold value in Euclidean distance. The corresponding relationship between the photographed image and the model image may be calculated at the search for the similar image in step S406.

When determined that there is no image (hereinafter referred to as a model image) most similar to the photographed image in S407, the process ends because the portable terminal does not have metadata to be transmitted. At this time, the portable terminal may display a message "unregistered image" on its display.

The registration unit 105 attaches metadata to each of the local feature points of the model image. The local feature points correspond to the near points. For example, a new entry may be added into the database (DB) storing the local metadata.

Second Embodiment

Figure 5:
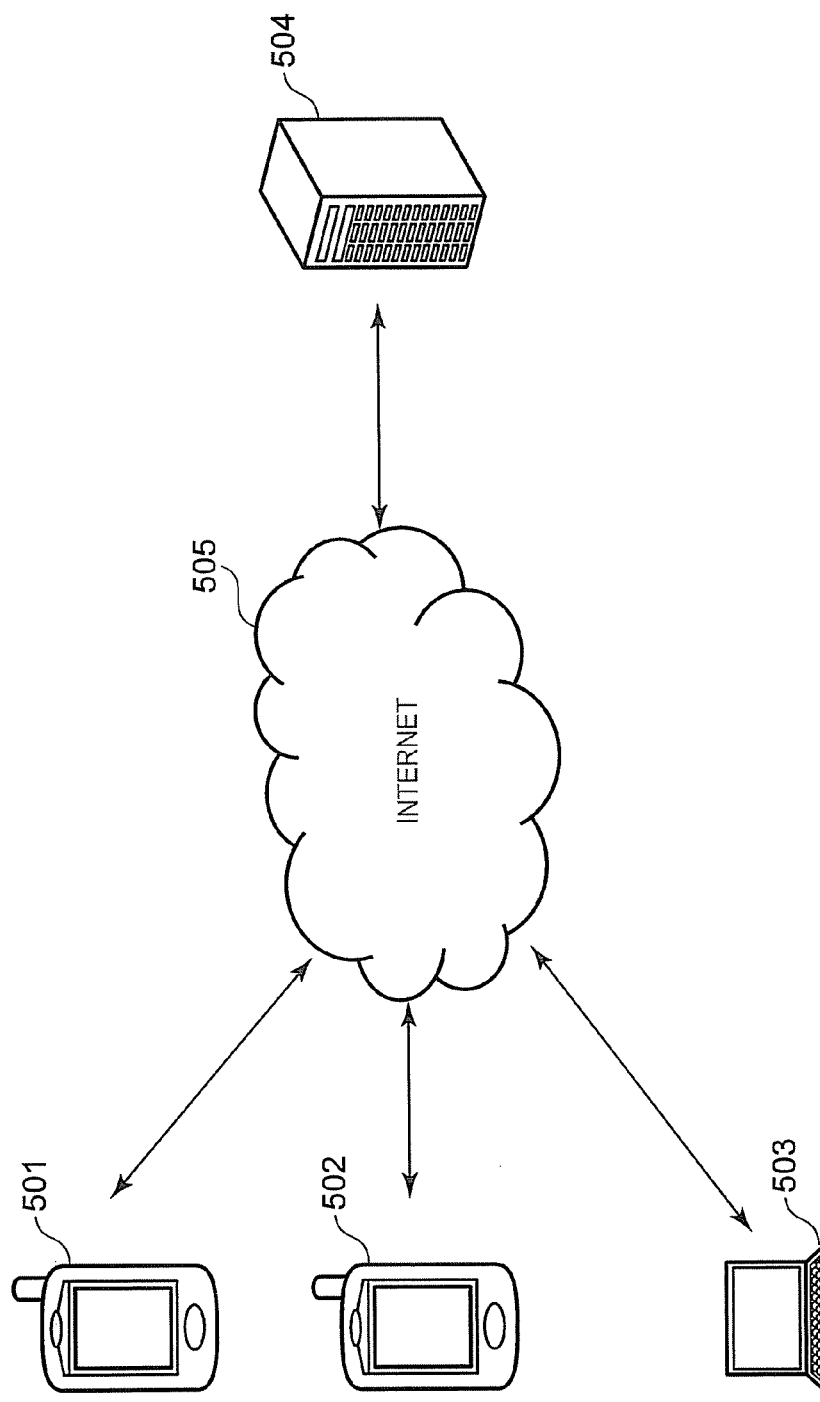
FIG. 5 is a diagram showing a system including the annotation apparatus according to the embodiment of the present invention.

Descriptions will now be made to a concrete process of the annotation apparatus according to this embodiment. FIG. 5 shows a configuration of a system interactively handling global metadata and local metadata that are attached by another user, using the annotation apparatus according to this embodiment. This system includes clients and a metadata management server 504. The clients include portable terminals 501 and 502, and a personal computer (PC) 503. The clients and the server are connected with each other through the Internet 505. The portable terminals and the PC may be connected to the Internet via wire or wireless connection.

Figure 6:
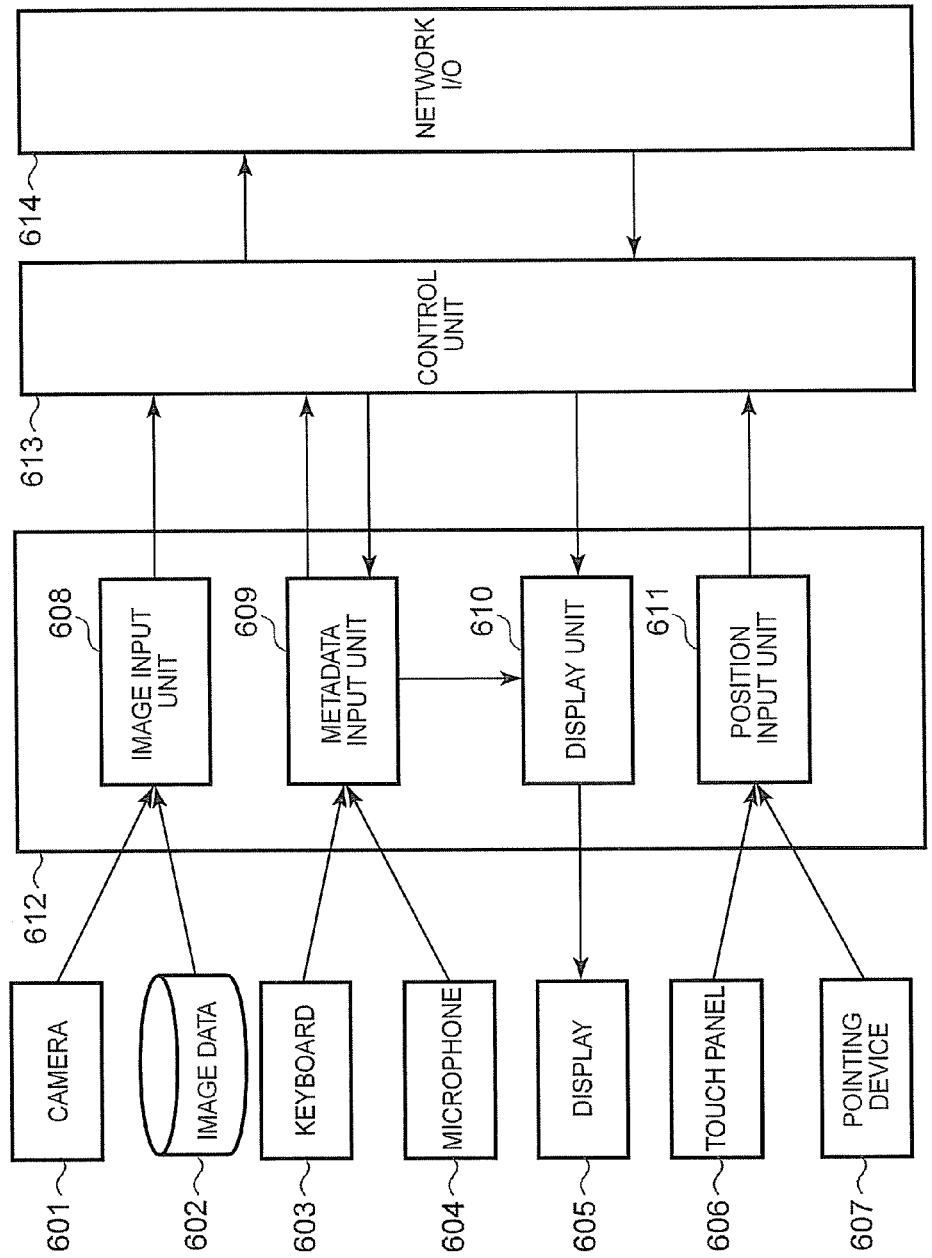
FIG. 6 is a diagram showing a case in which the system receives an input from portable terminals.

FIG. 6 is a diagram showing details of the system receiving inputs from the portable terminal 501 or 502. Descriptions will now be made onto details of the system with the portable terminal 501, by way of example. In this case, the portable terminal 501 may be the portable terminal 502 or the PC 503. The portable terminal 501 includes a camera 601 photographing objects, a keyboard 603 inputting metadata, a display 605 displaying images with metadata attached thereto, and a touch panel 606 for specifying the position of the local metadata. Instead of photographing an image with the camera, it is possible to use image data which has already been stored in a storage unit 602, such as a hard disk, or the like. Instead of inputting metadata with the keyboard, voice may be input using a microphone 604. After the voice is recognized so as to be converted to text data, the converted data may be input. To specify the position of the local metadata, it is possible to use a pointing device 607, such as a mouse or the like, other than the touch panel.

The portable terminal reads (loads) four modules of an image input unit 608, a metadata input unit 609, a display unit 610 and a position input unit 611, through a storage unit 612, such as a RAM. The image input unit 608 stores images, and transmits the images to the metadata management server 504 through a network input/output unit (network I/O) unit 614.

The metadata input unit 609 manages user-input metadata or metadata received from the server. The display unit 610 displays images or metadata on the display. The position input unit 611 detects the specified position for the local metadata, and transmits the detected position to the server. A control unit 613 controls operations of the modules of the image input unit 608, the metadata input unit 609, the display unit 610, and the position input unit 611.

Figure 7:
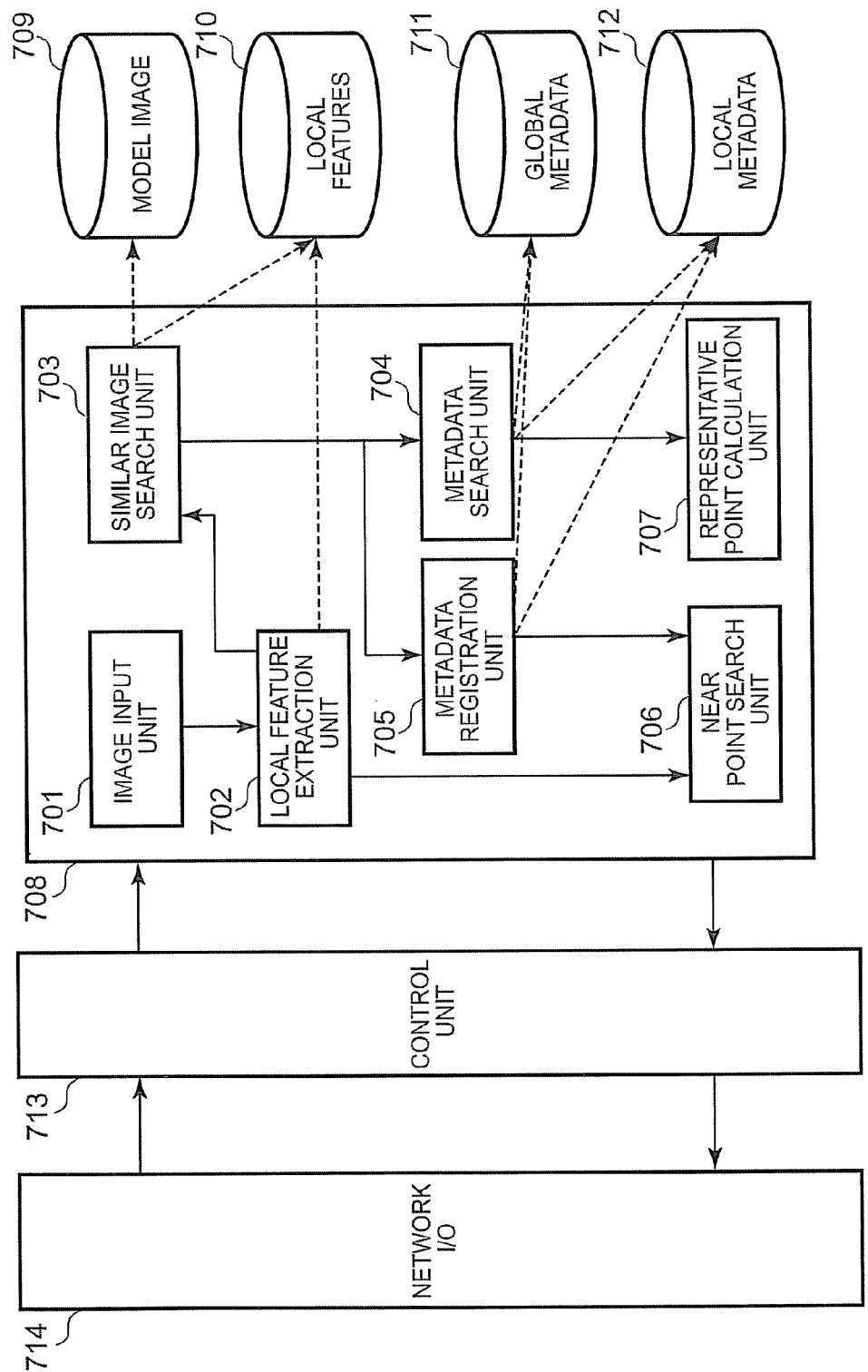
FIG. 7 is a diagram showing an example of a metadata management server.

FIG. 7 is a diagram showing an example of the metadata management server 504 which executes a process using an acquired image and/or local metadata from the portable terminal 501. A storage unit 708, such as a RAM, of the server loads seven modules of an image input unit 701, a local feature extraction unit 702, a similar image search unit 703, a metadata search unit 704, a metadata registration unit 705, a near point search unit 706, a representative point calculation unit 707. In FIG. 7, solid lines show data transmission/reception within the system, while dashed lines show data transmission/reception with each database.

The image input unit 701 temporarily shows images acquired from the portable terminal 501. The local feature extraction unit 702 extracts the local features of the stored images. The local features are image features, and may be obtained in accordance with a local feature extraction algorithm, such as a SIFT or SURF. The SIFT is to extract a feature point(s), stably existing regardless of a change in the resolution (scale), from the image, and is to obtain a 128-dimensional real-number vector(s) using luminance gradient information around the extracted feature points. The local features include the position of the feature point of the image and its feature vector. For example, the feature vector in the SIFT is represented with a 128-dimensional real-number vector(s). The matching (checking) of the feature points is calculated in Euclidean distance between the feature vectors.

Figure 8:
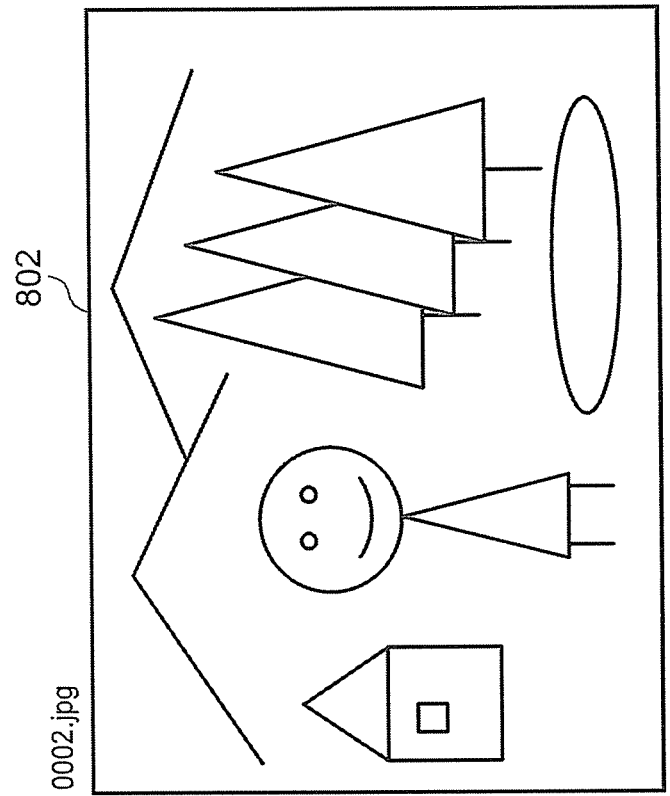
FIG. 8 is a diagram for explaining an example of a model image database.

The similar image search unit 703 searches a database (hereinafter referred to as a "model image DB") storing model images, for an image similar to the input image. FIG. 8 shows an example of the model image DB 709. The model image DB 709 stores images having metadata attached thereto. The stored images are those photographed by other users. Each model image is managed in a table 801, and is registered in association with unique image IDs with respective file names of the model images. In the painting example of FIG. 2, the model image ID of the painting is "2", and is stored in association with an image file 802 "0002.jpg". In this case, assume that the similar image search unit 703 returns an image ID=2 as an image that is most similar to the image photographed by each user shown in FIG. 1.

In general, the stage of searching for the image similar to the input image is called "specific object recognition". The specific object recognition may be performed in accordance with a method using a Euclidean distance between feature vectors and a voting strategy. In the voting strategy, the feature point of the model image, having the shortest Euclidean distance to each feature point of the photographed image, is searched. In addition, a vote is cast for the model image including the searched point. This strategic process is done for the feature points of all images. The model image having gained the highest number of votes is the final recognition result. Any image which has not been registered in the model image DB 709 is stored in the model image DB as a new image. The local features extracted from the image are stored in a local feature database (DB) 710.

Table 1 is an example of local metadata stored in the local feature DB 710. Because several hundred to several thousand points are extracted for one image, the local features are identified with the local feature point IDs and stored in association with 128-dimensional feature vectors. Registration and reading of the local metadata will be described later.

TABLE 1

| Image ID | Local feature point ID | Feature vector |
|---|---|---|
| ... | ... | ... |
| 2 | 1 | (23, 32, 54, 82, ...) |
| 2 | 2 | (18, 24, 12, 25, ...) |
| 2 | 3 | (135, 9, 24, 52, ...) |
| ... | ... | ... |

The metadata search unit 704 acquires metadata attached to the model image which is similar to the acquired image. The metadata registration unit 705 stores metadata transmitted from the client in the global metadata DB 711 or the local metadata DB 712. The metadata is stored in the database (DB) and shared with another user.

Table 2 is an example of the global metadata DB 711. The global metadata is stored in association with each image ID, because it is attached to the entire image. In the example of FIG. 8, five pieces of metadata are registered for the image with the image ID "2". Registration of the global metadata will be described later.

Table 3 is an example of the local metadata DB 712. This table shows the state in which metadata of "Mr. A" is attached for the local feature points 1, 2, and 3 corresponding to the image ID "2".

TABLE 2

| Image ID | Global metadata |
|---|---|
| ... | ... |
| 2 | Artist: Mr. B |
| 2 | Mountain Scenery |
| 2 | Work on scene with beautiful mountains |
| 2 | First work of Mr. B |
| 2 | My favorite work in Mr. B's works |
| ... | ... |

TABLE 3

| Image ID | Local feature ID | Local metadata |
|---|---|---|
| ... | ... | ... |
| 2 | 1 | Mr. A |
| 2 | 2 | Mr. A |
| 2 | 3 | Mr. A |
| ... | ... | ... |

As shown back in FIG. 7, the near point search unit 706 calculates the position(s) of the local feature point(s) for attaching the acquired local metadata. The representative point calculation unit 707 determines the position into which the local metadata is attached. A control unit 713 controls the operations of the above-described seven modules. The portable terminal 501 and the management server 504 transmit and receive image data or metadata through a network I/O 714.

Figure 9:
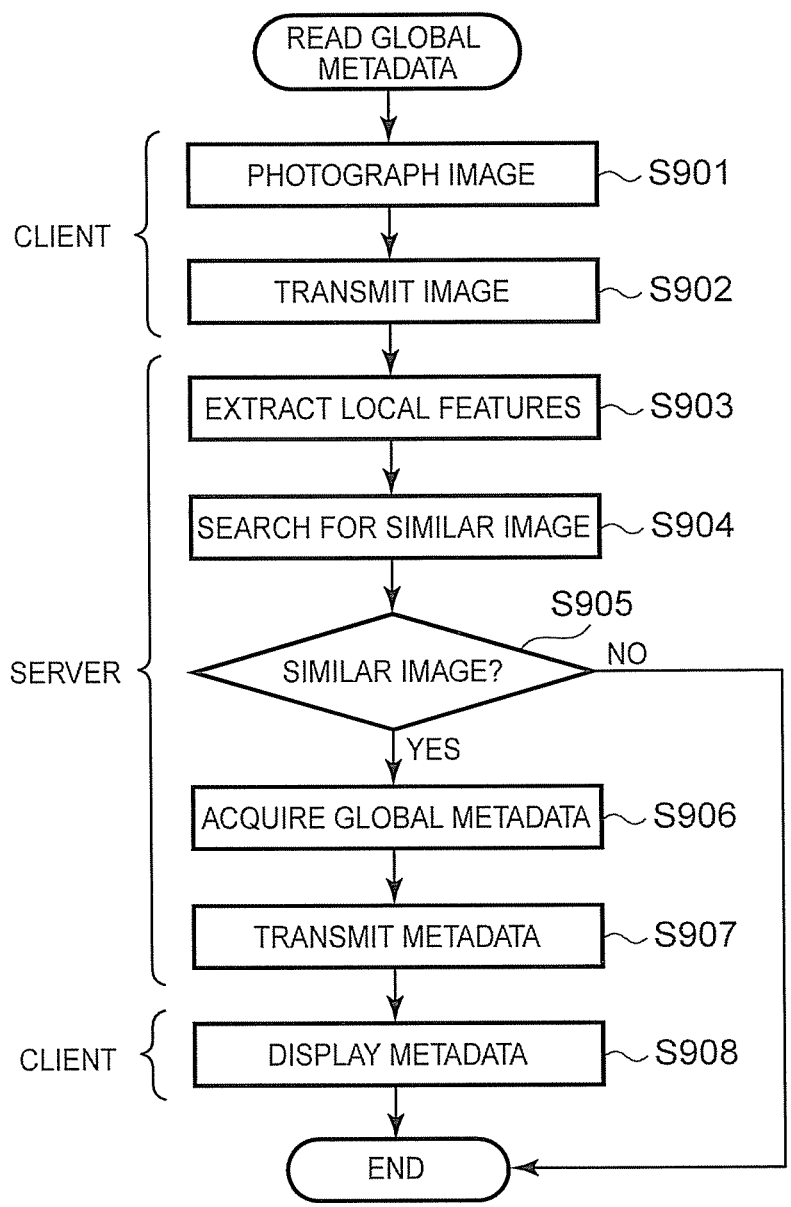
FIG. 9 is a flowchart for explaining a process for reading global metadata.

Descriptions will now be made to a process for registering global metadata. FIG. 9 is a flowchart for reading global metadata. This flowchart shows a process in which the portable terminal transmits an image to the server, and metadata received from the server is displayed on the display of the portable terminal.

First, the user photographs an image of an object using the image input unit, such as a camera of the portable terminal or the like (S901). An image which has already been photographed may be selected from the hard disk. The control unit of the portable terminal transmits the photographed image which has been read into the image input unit, to the server (S902). The control unit of the server receives and stores the image into the image input unit of the server. Thereafter, the local feature extraction unit extracts the local features of the photographed image (S903).

The similar image search unit searches the model image DB for a model image having the local features similar to the extracted local features of the photographed image (S904). The similar image search unit returns an image ID (similar image ID) of the model image most similar to the image. Next, the similar image search unit determines whether there is found an image similar to the image (S905). When determined that no similar image has been found, this process ends, because there is no metadata to be transmitted to the portable terminal. In this case, a message "unregistered image" may be displayed on the display of the portable terminal.

Figure 10:
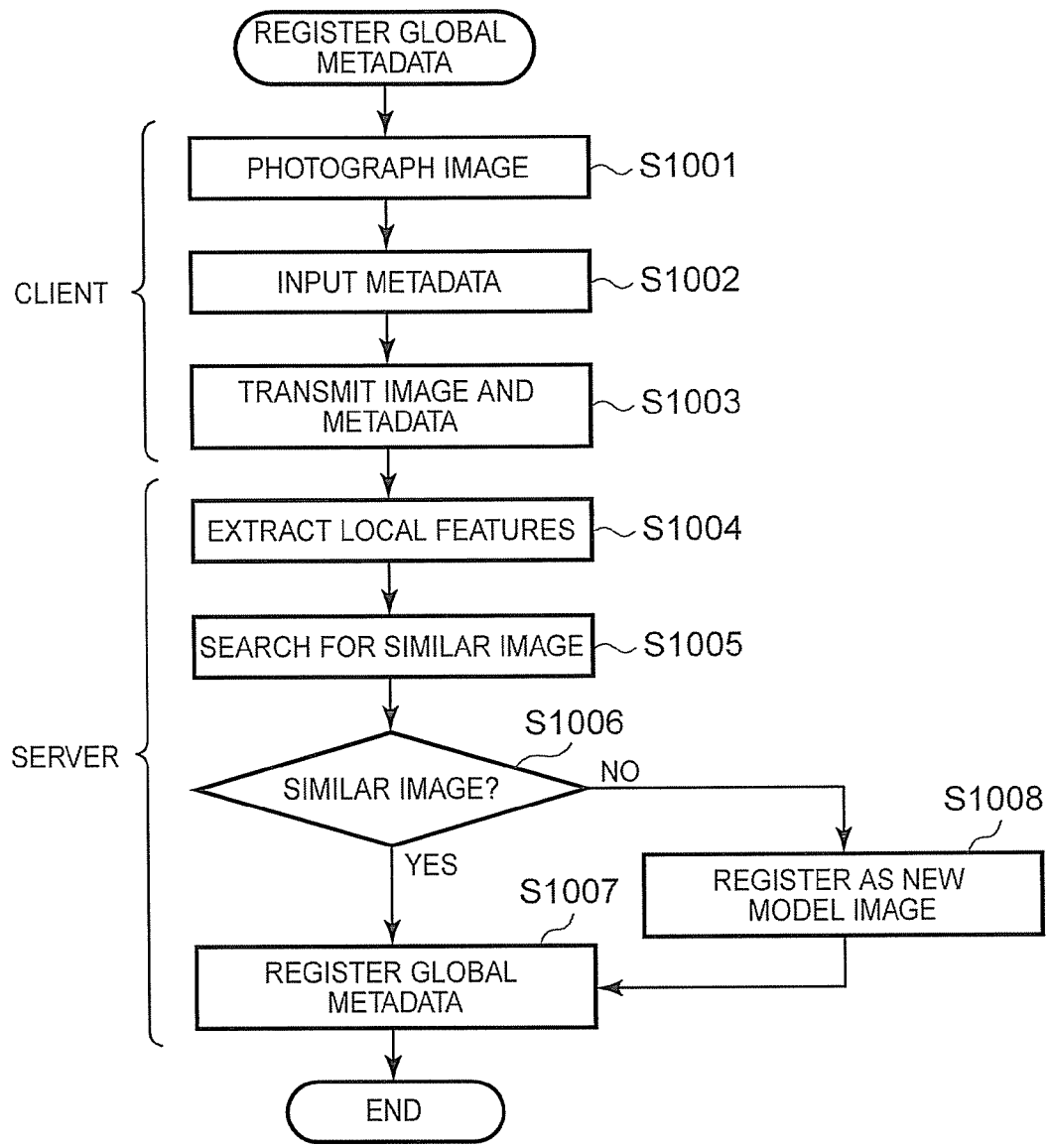
FIG. 10 is a flowchart for explaining a process for registering global metadata.

The user may register new global metadata. FIG. 10 is a flowchart for registering global metadata. Descriptions will now be made to a process, wherein the user inputs metadata together with an image, transmits the metadata with the image to the server, and register them as global metadata. The flowchart of FIG. 10 includes a part of the processing step of FIG. 9, and thus only the difference from FIG. 9 will now be described.

The metadata input unit acquires metadata input from the keyboard or microphone (S1002). The control unit transmits a set of the image and metadata to the server (S1003). Processing steps S1004 to S1006 are the same as those of FIG. 9. The metadata registration unit registers global metadata for the model image that is similar to the photographed image (S1007). A set of the similar image ID and user-input new metadata are added into the global metadata DB. When no similar image has been found, the image input unit registers the image as a new model image in the model image DB, because the image is not included in the model image DB (S1008). The local feature extraction unit newly registers the local features extracted form the image, into the local feature DB 709.

For a misdetermination that the image not similar to the photographed image is determined as a similar image, the similar image search unit once transmits a similar image to the portable terminal, asks the user to check whether the search result is correct, and encourages the user to input metadata.

It is apprehended that the capacity of the database exceeds, if an unlimited number of new images are registered. In this case, the number of times each image is accessed as a similar image is stored in the model image DB. Any of those model images with a small number of access times may be deleted.

As shown back in FIG. 9, the metadata search unit acquires the global metadata attached to the similar image ID from the global metadata DB (S906). As shown in Table 2, if a plurality of pieces of global metadata are attached to the same image ID, all of the global metadata are returned. Though not shown in Table 2, scores representing the importance of metadata may be attached thereto. Then, only effective metadata with a high score(s) may be returned. Now, the control unit transmits the acquired global metadata to the client (S907). The metadata input unit of the portable terminal receives metadata, and the display unit displays the photographed image and the metadata on the display (S908). According to the above-described processes, the photographed image and the image with metadata shown in FIG. 2 are displayed on the display of the portable terminal.

Figure 11:
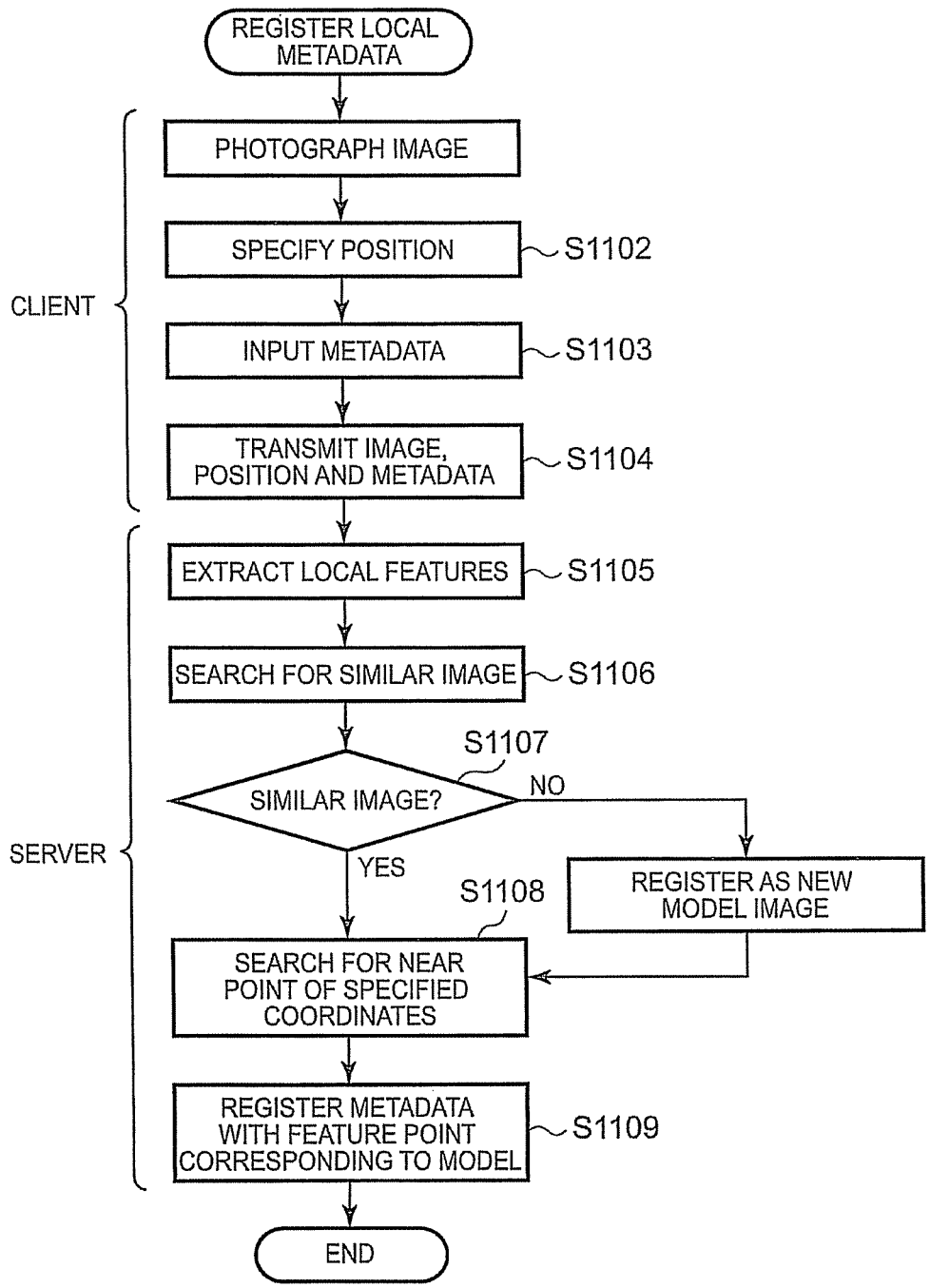
FIG. 11 is a flowchart for explaining a process for registering local metadata.

Descriptions will now be made to the registering of local metadata. FIG. 11 is a flowchart for registering local metadata. Descriptions will be made to an example of a process for registering local metadata. Specifically, the user specifies a part of the image and inputs metadata, while the portable terminal transmits the image, coordinates, metadata, to the server so as to register the local metadata. The flowchart of FIG. 11 includes a part of the flowchart of FIG. 10 which is to register the global metadata, and thus only the difference from FIG. 10 will now be described.

First, the user specifies a target position of the photographed image into which metadata is attached, using a touch panel or pointing device (S1102). The user inputs metadata to be registered in the specified position (S1103). The position input unit detects and stores coordinates (X1, Y1) on the specified image. The control unit of the portable terminal collects the image, coordinates and metadata, and transmits them to the server (S1104). In processing steps from steps S1105 to S1107, the local features of the photographed image are acquired as well as the registration of global metadata, and the similar image is searched.

The near point search unit acquires a group of local feature points around the coordinates (X1, Y1) specified by the user in the photographed image (S1108). The unit may acquire the points using a method for searching for K-nearest neighbor (a K-number of higher-rank points at a short distance). Specifically, the unit searches for the points included in the radius R of the coordinates (X1, Y1). The searched local feature points are near points of the specified coordinates (X1, Y1).

Now, obtained are the local feature points on the model image corresponding to each of the near points (S1109). The matching of the local features may be performed in accordance with a method using a threshold value in Euclidean distance. This corresponding relationship may be the same as that calculated at the search of the similar image in step S1106, and is not necessarily calculated again. Metadata is attached to each of the local feature points of the model image corresponding to the near points (S1109). In this case, a new entry may be added into the local metadata DB.

Figure 12:
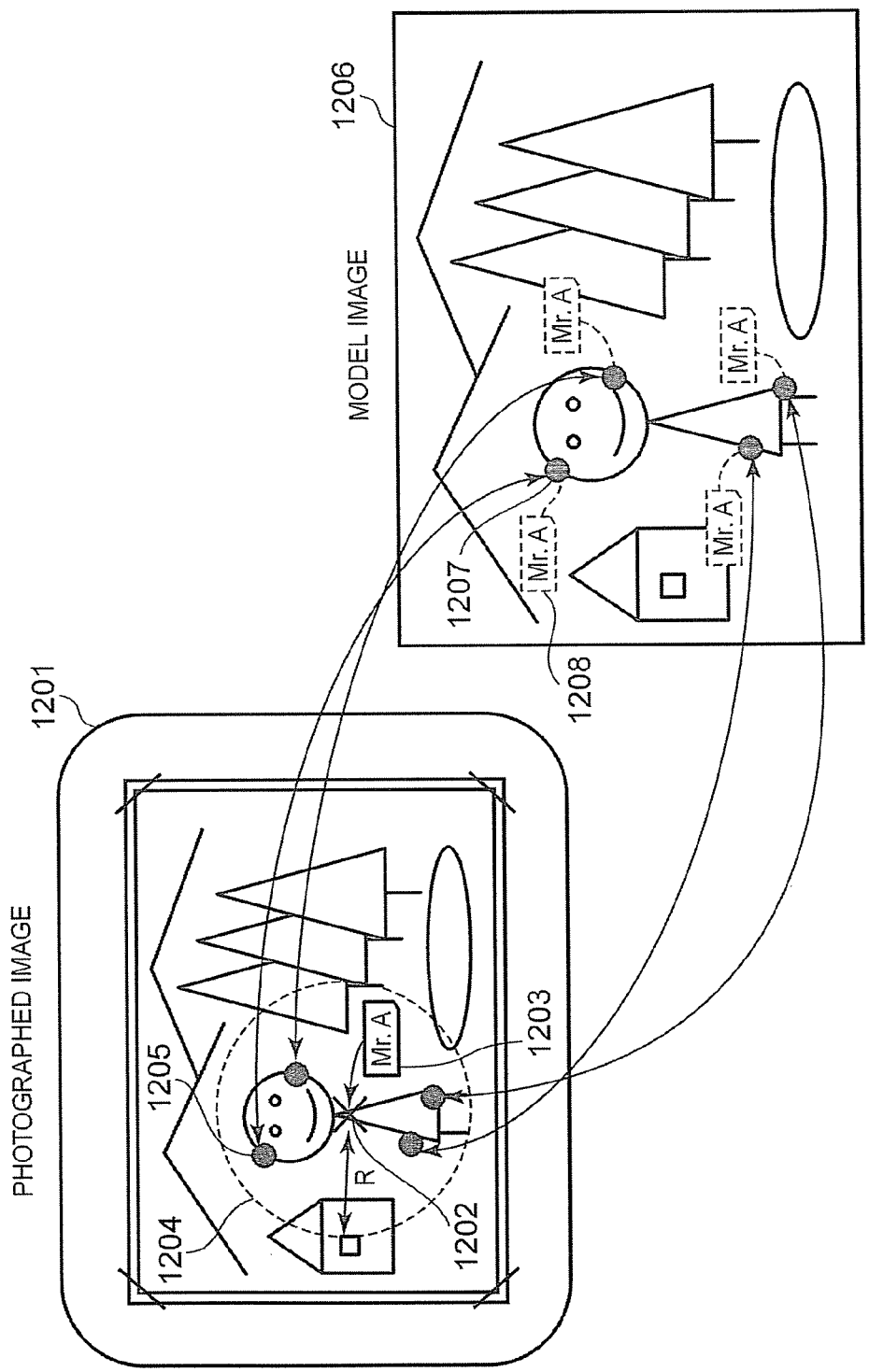
FIG. 12 is a diagram showing a concrete example of a process for registering local metadata.

Descriptions will now specifically be made to a method for registering the above-described local metadata with reference to FIG. 12. The portable terminal transmits an image 1201, specified coordinates 1202 and local metadata 1203 to the server. The server searches the model image DB for an image similar to the image. As a result, assume that a model image 1206 is found. The server searches for the local feature points included in a circle 1204 having the radius R corresponding to the specified coordinates, in order to register the local metadata "Mr. A". As a result, assume that four near points 1205 have been found. Local feature points 1207 on the side of the model image corresponding to the found near points are calculated, and local metadata 1208 is attached to the local feature points. In this case, for the sake of description, the illustration shows that metadata "Mr. A" appears on the model image. However, in fact, the metadata is not illustrated on the model image, but simply stored in the local metadata DB.

Figure 13:
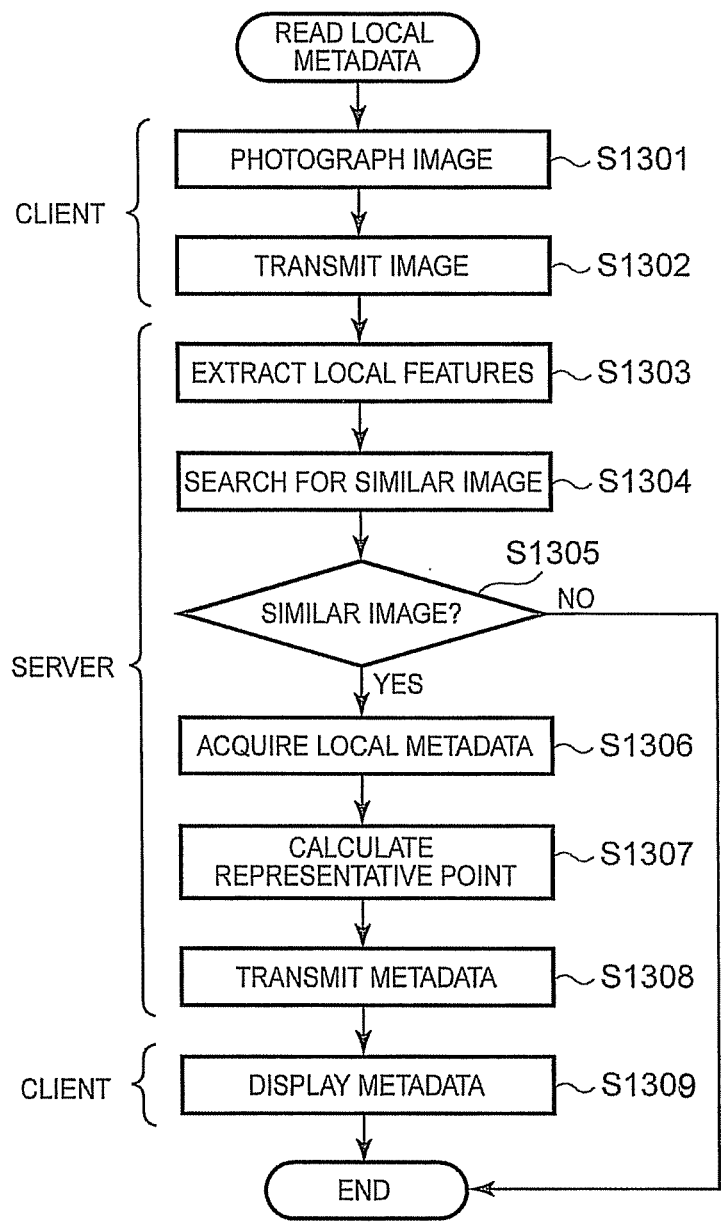
FIG. 13 is a flowchart for explaining a process for reading local metadata.

Descriptions will now be made to a process for reading local metadata. FIG. 13 is a flowchart for reading local metadata. In this process, local metadata is displayed on the photographed image, while maintaining the position of the local metadata attached to the model image. The flowchart of FIG. 13 includes a part of the flowchart of FIG. 9 for reading the global metadata, and thus only the difference from FIG. 9 will now be described.

The local feature points are extracted from the image transmitted from the user, and a determination is made as to whether there is an image similar to the transmitted image (steps S1301 to S1305). The metadata search unit acquires a group of local feature points to which local metadata of the similar image is attached, from the local metadata DB (S1306).

The representative point calculation unit 707 obtains the local feature points on the side of the photographed image corresponding to the local feature points of the acquired model image (S1307). The unit obtains the representative point of the group of local feature points of the acquired image. Descriptions will now be made to an example of a case wherein the representative point is the barycentric coordinates of the group. The barycentric coordinates are calculated based on the position of the group of local features, and the local metadata is attached to the barycentric coordinates.

The control unit transmits the local metadata and the barycentric coordinates to the portable terminal (S1308). The display unit of the portable terminal displays local metadata for the barycentric coordinates of the photographed image (S1309). According to the above-described processes, the image having the local metadata in the barycentric coordinates is displayed on the display of the portable terminal, as shown in FIG. 2. In this description, the representative point is the position of the barycentric coordinate. However, the metadata may be attached into the position of the local feature point within a predetermined distance from the user-specified position. When using the local feature point within a predetermined distance from the user specified position, a request that the user would like to specify can be reflected. For example, assume that the user would like to attach a particular name or title onto a part of the object, rather than attaching the name or title of its object. The user-input metadata may be attached into a position of the local feature point of the object that is the nearest point to the user-specified position. As a result, the contents of metadata can easily be shared with another user, when communicating images with each other.

When metadata is attached into the position of the barycentric coordinates, it is effective that the metadata is restored on a plurality of images representing the same object being photographed in different positions. Descriptions will now be made to a method for reading the above-described local metadata, with reference to FIG. 14. For example, consider that local metadata is attached to a photographed image 1401 uploaded to the server. This photographed image 1401 is not entirely the same image as the photographed image 1201, because they are photographed in different positions. Assume that a model image 1402 has been found as a similar image of the image. In this case, the local metadata can be restored in a correct position, even if the photographed image and the model image are not entirely the same, when the metadata is attached to the barycentric coordinates. The metadata search unit searches the local metadata DB, and finds four local feature points 1403 to which local metadata "Mr. A" is attached. Now, obtained are local feature points 1404 on the user's image side corresponding to the found local feature points. Then, local metadata "Mr. A" 1406 may be attached to the barycentric coordinates 1405.

When attaching local metadata to the gravity center of the plurality of local feature points, the restoration is stably achieved on the display unit. In one case, some of the local feature points may not be extracted and thus will be missed, due to a change in the image. Even a missing point occurs, the barycentric coordinates can be restored based on the rest of the points, as long as the local metadata is stored in association with the plurality of local features. In another case, even if there is an error in the matching of the local feature points, the position of the gravity center is not remarkably changed and is stable, as long as an average of the plurality of local feature points is obtained. For further stabilization of the gravity center, any largely-deviating local feature point may be excluded from the calculation of the gravity center, using an outliner detection method. When a plurality of pieces of local metadata correspond to one single model image, the barycentric coordinates may be obtained for each local metadata. As a result, as shown in FIG. 2, the plurality of pieces of local metadata can be attached to one single photographed image.

The metadata is not limited to text data, and may be any hyperlink URL, image, music, and moving images. In the descriptions, the painting has been described as an example of the object to be photographed. However, the object to the photographed may be any of book covers, CD/DVD jackets, posters, products, and persons. To achieve high accuracy in the search for a similar image, an appropriate algorithm for extracting local feature points may be selected based on the object. For example, face detection may be performed using Haar-like features, while detection of a person as a whole may be performed using co-HoG features.

According to the present invention, it is possible to acquire, from the server, global metadata and local metadata attached to the same object by another user, even if different photographed images are obtained by different users. Then, the acquired metadata can be displayed in an appropriate position on the photographed image.

Specifically, the user can attach metadata into an arbitrary specifying position, rather than the system attaching metadata into a pre-extracted area. When a plurality of users photographs the same object, the position into which metadata has been attached can be restored, even if its position or direction differs between the photographed images. The metadata can be attached to a part or entire part of the photographed image. Further the data can be shared and displayed while maintaining the position of the local metadata, thereby being shared with another user.

The annotation apparatus according to this embodiment includes a control device, a memory device, a communication I/F, an external memory device, a displaying device, an input device, and a bus. The control device includes a CPU (Central Processing Unit), or the like. The memory device includes a ROM (Read Only Memory), a RAM (Random Access Memory), or the like. The communication I/F is connected to the network for communications. The external memory device includes a HDD (Hard Disk Drive), a CD (Compact Disc) drive device, or the like. The displaying device presents data for annotation, and includes a display device, or the like. The input device includes a keyboard or mouse, with which the operator executes an identification process or acquires results. The bus connects each of the devices. The annotation apparatus has a hardware configuration using a general computer.

The process program(s) executed by the annotation apparatus according to this embodiment may be provided after being recorded on a computer readable recording medium, such as a CD-ROM (Compact Disk Read Only Memory), flexible disk (FD), CD-R (Compact Disk Recordable), DVD (Digital Versatile Disk), in the form of an installable format file or executable format file.

The process program(s) executable by the annotation apparatus according to this embodiment may be stored on a computer connected to a network, such as the Internet, and may be downloaded through the network so as to be provided. The process program(s) executable by the annotation apparatus according to this embodiment may be provided or delivered through a network, such as the Internet.

The process program(s) of this embodiment may be incorporated in the ROM or the like so as to be provided.

The present invention is not limited only to the above-described embodiment as is, and may be embodied by modifying the constituent elements without departing from the scope of the invention at the implementation. Various inventions may be formed by appropriate combinations of the plurality of constituent elements disclosed in the above-described embodiment. For example, some of the entire constituent elements may be excluded from those shown in the above-described embodiment. Further, the constituent elements over different embodiments may be applied in appropriate combinations.

What is claimed is:

1. A registering metadata apparatus comprising:
   a first acquisition unit which acquires a first image, first metadata, and a first position within the first image, the first position being for displaying the first metadata;
   an extraction unit which extracts local features from the first image;
   a calculation unit which searches for a group of the local features within a predetermined distance from the first position, and calculates a representative point of the group, the representative point being a center of gravity position of the group of the local features;
   a search unit which matches the first image with a plurality of images stored in a database by using the local features, and searches for a second image which coincides with the local features; and
   a registration unit which calculates at least one second position, within the second image, corresponding to the representative point, and registers the second position and the first metadata as metadata for the second image.

2. The registering metadata apparatus according to claim 1, further comprising:
   a second acquisition unit which acquires second metadata attached to the second image; and
   a display unit which displays the second image, and wherein
   said display unit displays the first metadata and the second metadata on the second image.

3. The registering metadata apparatus according to claim 1, further comprising:
   a second acquisition unit which acquires second metadata attached to the second image; and
   a display unit which displays the first image, and wherein said display unit displays the first metadata and the second metadata on the first image.

4. The registering metadata apparatus according to claim 1, further comprising
   an input unit inputting the first metadata or the first position by a user.

5. The registering metadata apparatus according to claim 4, wherein
   said input unit specifies a position to which the user attaches metadata, by using said input device including a touch panel or a pointing device.

6. A registering metadata method comprising:
   acquiring a first image, first metadata, and a first position within the first image, the first position being for displaying the first metadata;
   extracting local features from the first image;
   searching for a group of the local features within a predetermined distance from the first position;
   calculating a representative point of the group by a calculation unit, the representative point being a center of gravity position of the group of the local features;
   matching the first image with a plurality of images stored in a database by using the local features, and searching for a second image which coincides with the local features; and
   calculating at least one second position, within the second image, corresponding to the representative point; and
   registering the second position and the first metadata as metadata for the second image.

7. The registering metadata method according to claim 6, further comprising:
   acquiring second metadata attached to the second image; and
   displaying the second image; and wherein
   the first metadata and the second metadata on the second image are displayed.

8. The registering metadata method according to claim 6, further comprising:
   acquiring second metadata attached to the second image; and
   displaying the first image, and wherein
   the first metadata and the second metadata on the first image are displayed.

9. The registering metadata method according to claim 6, further comprising
   inputting the first metadata or the first position using an input unit by a user.

10. The registering metadata method according to claim 9, wherein
    said inputting step further includes specifying a position to which the user attaches metadata, by using the input device including a touch panel or a pointing device.

11. An attaching metadata method comprising:
    acquiring a first image, metadata to be attached to the first image and a target position of the first image into which the metadata is attached;
    extracting local features of the first image
    searching a model image having the local features similar to the local features extracted from the first image
    acquiring a group of local feature points around the target point in the first image;
    obtaining the local feature points in the model image searched as similar, said local feature points corresponding to the group of local feature points in the first image; and
    attaching the metadata of the first image at the local feature points in the model image, said local feature points obtained by said obtaining step;
    obtaining local feature points of a new image, the local feature points corresponding to the local feature points of the model image, when the new image is acquired and the new image is substantially similar to the model image;
    obtaining a representative point of the local feature points of the new image, the representative point being a center of gravity position of the local features; and
    attaching the metadata of the model image to the representative point of the new image.

* * * * *